Feb. 28, 1961  J. J. CASEY  2,973,426
ELECTRIC-ARC TORCH
Filed June 5, 1956
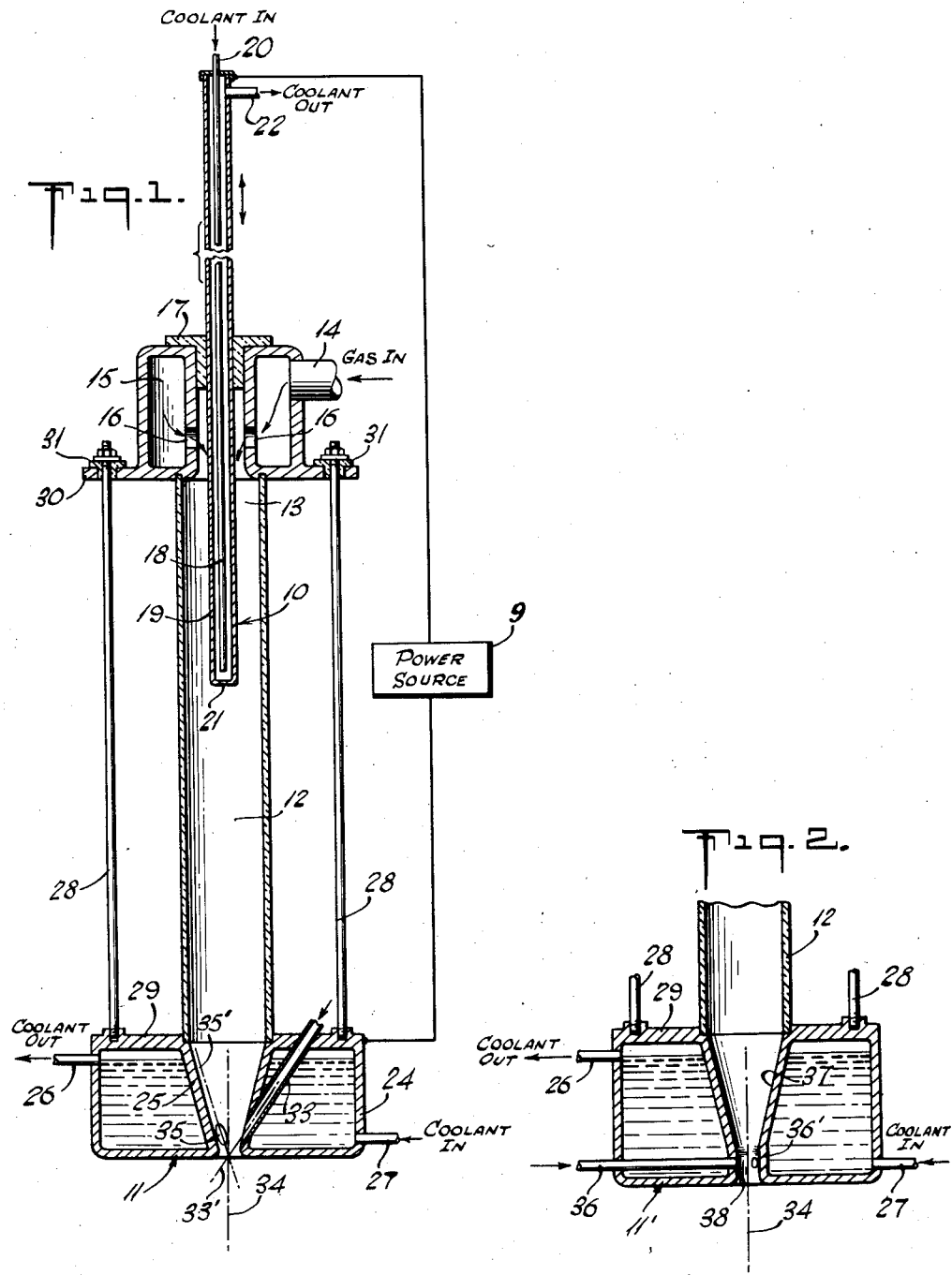
INVENTOR
JOSEPH J. CASEY
BY
ATTORNEYS

United States Patent Office 2,973,426
Patented Feb. 28, 1961

2,973,426
ELECTRIC-ARC TORCH
Joseph J. Casey, Bethel, Conn. (% Amalgamated Growth Industries, Inc., 11 W. 42nd St., New York, N.Y.)
Filed June 5, 1956, Ser. No. 596,376
(Filed under Rule 47(b) and 35 U.S.C. 118)
11 Claims. (Cl. 219—75)

My invention relates to an improved high-temperature electric-arc torch construction, and in particular to the variety in which a continuous gas flow along the arc path blows the arc beyond a hollow downstream electrode.

It is an object of the invention to provide an improved torch construction of the character indicated.

It is another object to provide an electric-arc torch lending itself to the development of high heat intensities without too substantially elevating the temperature of physical parts of the torch.

It is also an object to provide an improved torch construction wherein powdered or other solid material may be introduced into the arc within the torch without causing accumulations of deposited material within the torch proper.

It is a specific object to meet the above objects with a construction in which powdered or other material to be heated and sprayed by the torch may be processed by the torch most effectively for purposes of coating such material on an externally supported member or surface.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a simplified longitudinal sectional view of an electric-arc torch incorporating features of my invention; and Fig. 2 is a fragmentary longitudinal sectional view illustrating a modification.

Briefly stated, my invention contemplates an improved electric-arc torch of the variety in which a gas flow along an elongated arc is employed to define the arc and to blow the same out the end of a hollow downstream electrode. The present invention is particularly directed to improved means whereby such a torch can accommodate the injection of material to be melted or vaporized by the torch, as for external coating applications, and I have found that for certain applications involving injection of powder and other solid matter, highly efficient coating may be achieved when the injection takes place at the downstream nozzle.

Referring to Fig. 1 of the drawings, my invention is shown in application to an electric-arc torch comprising an upstream electrode member 10 and a hollow or annular downstream electrode member 11, electrically excited by suitable source means 9; the downstream electrode may be internally contoured as a convergent nozzle, for purposes which will later be clear. An arc chamber 12 communicates with the bore of the downstream electrode 11 and overlaps with the upstream electrode to define an annular inlet 13 constituting part of the gas-supply means. In the form shown, the gas is supplied as at inlet 14 to an annular manifold 15 surrounding the upstream electrode structure 10 and having a plurality of ports 16 communicating with the chamber inlet 13. The axes of inlet ports 16 are preferably similarly inclined or offset from alignment with the axis of electrode 10 so that the introduction of gas through ports 16 and into the chamber 13 is accompanied by consistent promotion of helical or swirling gas flow; this swirling action continues down the length of chamber 13 and through the nozzle electrode 11, and serves to confine or concentrate arc plasma centrally of the chamber 13. The chamber 12 may be metallic, but insulated from the electrodes 10—11; however, in the form shown, the chamber 12 is itself of insulating material, as, for example, a suitable ceramic.

For convenience in striking the arc, I prefer that the upstream electrode 10 shall be considerably elongated and that it shall be adjustably longitudinally positionable within the chamber 12, the length of electrode 10 being such as to permit contact with the downstream electrode 11 when initiating an arc. After contact, the electrode is bodily withdrawn to establish an arc of desired length, commensurate with the gas flow introduced at 16 and with the other purposes to be served by torch operation.

In order to facilitate longitudinal positioning of the electrode 10 for the purposes indicated, I have shown a flanged guide bushing 17 seated on the manifold 16; bushing 17 guides and frictionally holds a desired longitudinal position of the electrode 10. For cooling purposes, the electrode 10 may comprise inner and outer concentric tubes 18—19, defining within tube 18 a means for conducting coolant from an external inlet 20 directly to the backside of the upstream electrode or target surface 21. A thin conductive target 21 permits rapid and efficient heat transfer to the coolant, which then flows in the annular space between tubes 18—19 and is exhausted at the port 22.

The downstream electrode may also be of the cooled variety and thus comprises a circumferentially extending jacket 24 connected to the downstream electrode proper 25. Inlet and outlet means 26—27 are shown for circulation of coolant fluid within the circumferential jacket 24. Tie rods 28 serve to clamp the assembly together and are shown extending between the base plate 29 of the downstream electrode and the flange 30 of the inlet manifold 15. Although not necessary for torch operation, the tie-rod connection is shown establishing an electrically insulated relation between the downstream electrode 11 and the manifold 15, as by providing insulating bushings 31 where the rods 28 are secured to the flange 30.

In accordance with the invention, my torch construction is rendered particularly adapted to coating operations by employing an injection passage or passages 33 at an extreme downstream location as, for example, by forming such passages in the body of the downstream electrode proper. Passages 33 are preferably so oriented as to discharge into the arc plasma, preferably near the downstream end of the torch; and may pass through the body of coolant within jacket 24, as shown. In the form shown, nozzle convergence in the downstream electrode accelerates gas flow and concentrates the arc plasma just prior to arc discharge at the downstream end of the torch, and thus provides ideal conditions for rapid heating and sprayed ejection of injected material.

In Fig. 1, I have indicated my preference that the alignment of the injection passage 33 shall be generally in the downstream direction of flow and that discharge from injection passage 33 shall be such as to always clear physical parts of the downstream electrode. This is achieved by so directing the discharge end of the injection passage 33 as to always project out the downstream end of the electrode 11, regardless of the gas flow conditions in the torch, so that any possibility of contamination of the nozzle within electrode 11 is avoided. In the form shown, the axis 33' of the injection passage 33 intersects the axis 34 of the torch proper at the most extreme downstream location of the torch proper. In the event that pluralities of passages 33 are employed, as suggested at 35 for a second of three such passages, then I prefer that the axes of all injection passages shall substantially intersect at the same location on the torch axis 35; in the drawing, the axis 35' suggests the orientation of a further such injection passage.

In Fig. 2, I show a slight modification wherein injection is accomplished in more or less strictly radial injection passages 36, which again may be provided in plurality about the axis 34 of the torch proper. In the form shown in Fig. 2, the downstream electrode 11' is internally contoured first with a converging section 37, and then with a throat section 38, injection being accomplished at the most restricted section or throat of the downstream electrode. Other parts of the structure may be the same as those described for Fig. 1.

Regardless of the simplicity of my improved torch construction, the results achieved in coating applications are of striking significance. With previous constructions, and for the case of certain types of injection powders, operations were impaired by undesirable accumulations within the torch proper, thereby unduly restricting the continuity of operation; however, with my construction, this difficulty is or may be avoided. In a construction as in Fig. 2, of course care must be taken that the rate of powder or other injection at 36 is carefully regulated with respect to the gas flow and arc intensity in order to assure that undesirable deposits are avoided within the throat 38 of the downstream electrode 11'.

In a typical use of my improved construction, I have obtained extremely adherent coatings, such as fused alumina on sheet-steel specimens. In these uses, the specimen is maintained electrically neutral or floating and is placed directly in the path of the arc flame issuing from the downstream electrode 11 on the axis 34. For an inter-electrode length of 15 inches, nozzle-throat area of about 0.25 in.$^2$, operating potential of about 500 volts A.-C., and gas flow (air) of 40 ft./sec. at the throat, finely divided metal powders or metal oxide powders, such as aluminum oxide, may be aspirated or force-fed through passages 33—34, for development of the desired coating.

Although my invention has been described in detail in application to the injection of powders at the passages 33—35—36, it will be clear that one or more of these passages may be supplied with a gas. Such gas may serve as a conveying medium for the injected powder or may be supplied without powder; it may or may not be the same as the gas introduced at 14, depending on whether oxidizing, reducing or other functions are to be achieved at and beyond the downstream-injection location. When a gas thus injected (at 33) provides exothermic reaction with the torch carrier gas (injected at 14) or with powder or other solid, the thermal capacity of a given installation is increased. It will be noted that this is achieved without raising the wall temperature of chamber 12, because the additional heat development is downstream from chamber 12.

While I have described the invention in detail for the preferred forms illustrated, it will be understood that modifications may be made within the scope of the invention as defined in the claims which follow.

I claim:

1. In an electric-arc torch, an upstream electrode, a hollow downstream electrode, an arc chamber defining a passage extending axially between said electrodes and electrically insulated therefrom, said chamber axially spacing all parts of said upstream electrode from all parts of said downstream electrode, inlet gas-supply means surrounding said upstream electrode and continuously feeding gas within said arc chamber in the vicinity of said upstream electrode, said downstream electrode having formed therein an injection passage communicating between an inlet external to said chamber and an outlet within the central opening of and near the downstream end of said downstream electrode, and means for continuously connecting an arc potential across said electrodes.

2. In an electric-arc torch, an elongated arc chamber defining a passage having a gas-supply inlet at the upstream end thereof, means for supporting an upstream electrode within said chamber at the upstream end thereof and extending downstream of said gas-supply inlet, a downstream electrode axially spaced in its entirety from said upstream electrode and having a bore communicating with the downstream end of said chamber, said bore being of convergent cross-section in the downstream direction and thereby defining a downstream nozzle, and said downstream nozzle having an injection passage communicating with said bore near the downstream end thereof, and means for connecting an arc potential across said electrodes.

3. A torch according to claim 2, in which said injection passage at the location of discharge into said bore is inclined generally in the direction of flow downstream through said torch.

4. A torch according to claim 2, in which the alignment of said injection passage at the location of discharge into said bore is such as to clear the downstream end of said bore without interference with physical parts of said downstream electrode.

5. A torch according to claim 2, in which the location of discharge of said injection passages into said nozzle bore is at substantially the location of minimum cross-section of said bore.

6. In an electric-arc torch, an upstream electrode, an annular downstream electrode, and an arc chamber having one end communicating with the bore of said downstream electrode and having another end surrounding said upstream electrode, said electrodes being axially spaced in their entirety, gas-supply means continuously with the upstream end of said chamber for directing a flow of gas downstream through said downstream electrode, cooling means surrounding the bore of said downstream electrode, an injection passage communicating with the bore of said downstream electrode and passing through said cooling means, and means for applying an arc potential across said electrodes.

7. In an electric-arc torch, an upstream electrode, an annular downstream electrode, and an arc chamber having one end communicating with the bore of said downstream electrode and having another end surrounding said upstream electrode, said electrodes being axially separated in their entirety, gas-supply means communicating with the upstream end of said chamber for directing a flow of gas downstream through said downstream electrode, coating material injection means including an injection passage formed in said downstream electrode and directed to discharge injected material into the center of the stream passing through said downstream electrode, and means for applying an arc potential across said electrodes.

8. A torch according to claim 7, in which said last-defined means comprises a plurality of injection passages oriented to discharge injected material into the center of said stream at substantially the same longitudinal position.

9. A torch according to claim 8, in which said longitudinal position is substantially at the exit of said downstream electrode.

10. The method of applying a coating material with a high-temperature electric-arc torch having an upstream electrode axially spaced from an annular downstream electrode, which comprises inducing a gas flow across the axial space from said upstream electrode to and through said downstream electrode, maintaining an arcing potential between said electrodes, whereby arc plasma is concentrated at the location of gas issue through said downstream electrode, and injecting coating material into said plasma at said location.

11. In an electric-arc torch, an enclosing chamber including an upstream tubular portion having an inlet for continuous admission of gas flow, and a downstream tubular portion having an outlet for continuous discharge of torch-exhaust products, the inner wall of said downstream portion including a restriction constituting the minimum cross-sectional opening of the passage defined by said inner wall, said upstream tubular portion including an upstream electrode, said downstream tubular portion including a downstream electrode at said restriction, said electrodes being separated in their entirety in the flow direction through said chamber, said downstream tubular portion including an injection passage having an externally accessible inlet and having an outlet discharging directly toward the flow axis at said restrictions, and means for applying an arc potential across said electrodes.

References Cited in the file of this patent

UNITED STATES PATENTS

| | | |
|---|---|---|
| 1,128,059 | Schoop | Feb. 9, 1915 |
| 2,011,872 | Rava | Aug. 20, 1935 |
| 2,194,920 | Vaughn et al. | Mar. 26, 1940 |
| 2,587,331 | Jordan | Feb. 26, 1952 |
| 2,770,708 | Briggs | Nov. 13, 1956 |